(12) United States Patent
Fu et al.

(10) Patent No.: US 10,162,066 B2
(45) Date of Patent: Dec. 25, 2018

(54) COINCIDENCE-ENABLING PHOTON-COUNTING DETECTOR

(71) Applicant: General Electric Company, Schenectady, NY (US)

(72) Inventors: Geng Fu, Rexford, NY (US); Yannan Jin, Schenectady, NY (US); Peter Michael Edic, Albany, NY (US); Feng Chen, Schenectady, NY (US)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 194 days.

(21) Appl. No.: 15/425,800

(22) Filed: Feb. 6, 2017

(65) Prior Publication Data

US 2018/0224564 A1    Aug. 9, 2018

(51) Int. Cl.
*G01T 1/17*    (2006.01)
*G01T 1/24*    (2006.01)
*G01T 1/29*    (2006.01)

(52) U.S. Cl.
CPC ............... *G01T 1/247* (2013.01); *G01T 1/17* (2013.01); *G01T 1/2928* (2013.01)

(58) Field of Classification Search
None
See application file for complete search history.

(56) References Cited

U.S. PATENT DOCUMENTS

| | | | |
|---|---|---|---|
| 6,936,822 B2 | 8/2005 | Wong et al. | |
| 6,950,493 B2 | 9/2005 | Besson | |
| 7,488,945 B2 | 2/2009 | Li et al. | |
| 7,916,836 B2 | 3/2011 | Tkaczyk et al. | |
| 8,044,681 B2 | 10/2011 | Rao et al. | |
| 8,050,385 B2 | 11/2011 | Proksa | |
| 8,159,286 B2 | 4/2012 | Rao et al. | |
| 8,384,038 B2 | 2/2013 | Guo et al. | |
| 8,530,846 B2 | 9/2013 | Cook et al. | |
| 8,941,076 B2 | 1/2015 | Abraham | |
| 9,002,084 B2 | 4/2015 | Shahar et al. | |
| 2004/0195512 A1 | 10/2004 | Crosetto | |
| 2007/0076848 A1 | 4/2007 | Walter et al. | |
| 2009/0129537 A1 | 5/2009 | Rao et al. | |
| 2009/0304149 A1* | 12/2009 | Herrmann | A61B 6/4233 378/62 |
| 2013/0126748 A1 | 5/2013 | Rao et al. | |

(Continued)

OTHER PUBLICATIONS

Zhang, Feng, et al.; "Performance of 3-D Position Sensitive CdZnTe Detectors for Gamma-Ray Energies above 1 MeV", IEEE Nuclear Science Symposium Conference Record, pp. 2012-2016, 2009.

(Continued)

*Primary Examiner* — Hoon K Song
(74) *Attorney, Agent, or Firm* — GE Global Patent Operation; Pabitra Chakrabarti (57) ABSTRACT

The present approach relates to the use of energy-resolved, photon-counting detectors, such as CZT- or CdTe-based detectors, to acquire spectral information that is not available with conventional energy-integrating detectors. In certain embodiments, the present approach discussed reduces or eliminates spectral contamination incurred by transient signals in neighboring pixels in designs employing coincidence logic and shaping amplifiers with short shaping times.

21 Claims, 7 Drawing Sheets

(56) References Cited

U.S. PATENT DOCUMENTS

2015/0185332 A1* 7/2015 Herrmann ................ G01T 1/17
250/336.1

OTHER PUBLICATIONS

Iwanczyk, Jan S., et al.; "Photon Counting Energy Dispersive Detector Arrays for X-ray Imaging", IEEE Trans Nucl Sci., vol. No. 56, Issue No. 03, pp. 535-542, 2009.
Vernon Emerson, et al.; "ASIC for high rate 3D position sensitive detectors", IEEE Transactions on Nuclear Science, vol. No. 57, pp. 1536-1542, 2010.
Fritz, Shannon; "Characterization of Photon Counting CZT Detectors for Medical X-Ray Imaging and Spectroscopy", 2011.

\* cited by examiner

COINCIDENCE-ENABLING PHOTON-COUNTING DETECTOR

STATEMENT REGARDING FEDERALLY SPONSORED RESEARCH & DEVELOPMENT

This invention was made with Government support under contract number 1U01EB017140-01A1 awarded by the National Institute of Biomedical Imaging and Bioengineering. The Government has certain rights in the invention.

BACKGROUND

The subject matter disclosed herein relates to the use of energy-resolved photon-counting detectors.

Non-invasive imaging technologies allow images of the internal structures or features of a subject (patient, manufactured good, baggage, package, or passenger) to be obtained non-invasively. In particular, such non-invasive imaging technologies rely on various physical principles, such as the differential transmission of X-rays through the target volume or the reflection of acoustic waves, to acquire data and to construct images or otherwise represent the internal features of the subject.

For example, in X-ray-based imaging technologies, X-ray radiation spans a subject of interest, such as a human patient, and a portion of the radiation impacts a detector where the intensity data is collected. In X-ray systems, a photodetector produces signals representative of the amount or intensity of radiation impacting discrete pixel regions of a detector surface. The signals may then be processed to generate an image that may be displayed for review.

In one such X-ray-based technique, known as computed tomography (CT), a scanner may project fan-shaped or cone-shaped X-ray beams from one or more X-ray sources at numerous view angle positions about an object being imaged, such as a patient. The X-ray beams are attenuated as they traverse the object and are detected by a set of detector elements which produce signals representing the intensity of the incident X-ray beams on the detector. The signals are processed to produce data representing the line integrals of the linear attenuation coefficients of the object along the X-ray paths. These signals are typically called "projection data" or just "projections". By using reconstruction techniques, such as filtered backprojection, images may be generated that represent a volume or a volumetric rendering of a region of interest of the patient or imaged object. In a medical context, pathologies or other structures of interest may then be located or identified from the reconstructed images or rendered volume.

Conventionally, radiation detectors used in these types of imaging techniques operate in an energy-integrating mode (i.e., readout of the total integrated energy deposited during an acquisition interval) or a photon-counting mode (each individual X-ray photon is detected). Energy integration is the conventional mode for reading out X-ray detectors in most clinical applications. However, energy-integrating readout approaches operate poorly in low-flux imaging applications, where electronic noise associated with the detector readout operation may overwhelm the available signal.

In some applications, individual X-ray photon counts are of more interest than the total integrated energy information associated with energy-integrating approaches. Conventional scintillator-based photon-counting modes utilize silicon photomultipliers (SiPMs) that are expensive and not practical for high count rate applications such as CT; such technology is used with positron emission tomographic systems. Further, such photon-counting approaches may be limited in the type of information they produce, such as yielding only the raw photon count number without associated energy information.

In contrast, certain techniques, such as dual-energy (e.g., high- and low-energy imaging) and/or material-decomposition imaging, benefit not only from photon counts in a generic sense, but from obtaining spectral information, i.e., energy information, for a given exposure event. That is, such techniques generate photon counts that are separated into respective energy bins, and thus discriminate between photon events at different energies, thereby characterizing or counting the number of photons observed at different photon energy ranges. To address this need, certain energy-discriminating, photon-counting X-ray detector technologies may be employed. In certain instances, such approaches employ a detection medium that directly converts incident X-rays to measurable signal (i.e., electron-hole pairs as with direct conversion materials), as opposed to techniques employing a scintillator-based intermediary conversion and subsequent detection of the generated optical photons.

However, the practical use of such photon-counting, energy-discriminating detectors still face certain technical challenges. One such challenge is the count-rate capability. When the photon flux is too high, the energy information associated with the detected signal gets distorted due to the pile-up effect (photons arrive too quickly for their energy to be properly characterized—the photons "pile up" in the detector). Existing approaches to address this issue, e.g. utilizing filters providing a short shaping time, can differentiate the incident events that occur within a short time interval, but can also lead to incomplete signal (charge) collection within the sensor and increased sensitivity to the cross-talk (i.e., transient) signal observed in adjacent detector channels.

A second challenge of photon-counting, energy-discriminating detectors is the charge-sharing effect. When an incident photon interaction occurs near the edge of a detector pixel, it creates a signal either by multiple X-ray interactions (i.e., K-escape, Compton scatter) or by charge sharing (i.e., electron cloud sharing) across the pixel boundary and is thus detected by multiple pixels, i.e., the respective signal in each of the effected pixels. This effect degrades the energy resolution by causing a low-energy tail in the spectral response function. To address this problem, it has been proposed to use coincidence logic to identify multiple-pixel events and digitally sum the signal of the neighboring pixels. To clarify, coincidence logic estimates the arrival time of a photon and determines if multiple detector pixels in a local neighborhood detect this event. If so, the energy from the neighboring pixels is summed, and the associated counter in the pixel containing the centroid of the detected energy is incremented.

However, the present approaches to address both of these challenges leads to a further issue. In particular, when a detection event occurs near the boundary between two pixels, resulting in uneven amounts of signal in the two pixels due to charge sharing, the coincidence logic can correctly identify and sum the two signals with a small quantity of signal loss. However, if the incident photon interaction occurs entirely within one of the pixels (with no charge-sharing occurring), the weighting potential crosstalk (i.e. transient signal) may be mistaken by the coincidence logic as charge sharing and may erroneously result in a summing operation being performed, potentially causing an overestimation of the detected signal.

BRIEF DESCRIPTION

In one embodiment, a detector readout circuit is provided. In accordance with this embodiment, the circuit includes a charge-sensitive amplifier including at least an amplifier configured to receive an input charge from a detector pixel and to output an amplified (voltage) signal; a reset switch configured to receive a reset signal; and a capacitor in electrical communication with both the reset switch and amplifier. The circuit further includes a shaping amplifier configured to possibly provide extra gain and also filter noise from the amplified signal while providing an output pulse having a much faster return to the baseline. The shaped signal generally has a time duration of 50 ns or less. The detector circuit further includes energy readout and control circuitry configured to receive the shaped signal from the shaping amplifier. The energy readout and control circuitry includes at least: an integrator configured to receive the shaped signal and to integrate the shaped signal over a time interval to generate an integrated signal; a comparator configured to receive the integrated signal and to generate a signal indicating a true detection event based on a threshold such that the integrated signal is greater than the threshold, and a peak analog-to-digital converter (ADC) or multiple-threshold counter configured to receive the shaped signal and to output energy information for a detection event. The detector circuit further includes a delay circuit configured to receive an output from the comparator and to generate a delay signal to reset the charge-sensitive amplifier.

In a further embodiment, a method for processing a detector signal from an energy-discriminating radiation detector is provided. In accordance with this method the charge signal from the detector pixel is received at a charge-sensitive amplifier, which outputs an amplified signal. A shaping operation is performed on the amplified signal to generate a shaped signal. The shaping signal generally has a time duration of 50 ns or less. The shaped signal is received at an integrator configured to integrate the shaped signal over a time interval to generate an integrated signal. The integrated signal is compared to a threshold, thereby identifying those integrated signals greater than a threshold voltage. A peak analog-to-digital conversion is performed on the shaped signal to generate a measured energy for the detector signal, based on the output of the comparison of the integrated signal to the threshold signal (voltage).

In an additional embodiment, an imaging system is provided. In accordance with this embodiment, the imaging system includes an X-ray source configured to emit X-rays; an energy-discriminating photon-counting radiation detector, comprising pixels that are manufactured using direct-conversion material; a readout circuit; and image processing circuitry configured to receive at least energy measurements of the detector circuit and to generate an image based on the energy measurements. In accordance with this embodiment, the detector readout circuit includes a charge-sensitive amplifier including at least an amplifier configured to receive an input signal from the energy-discriminating photon-counting radiation detector and to output an amplified signal, a reset switch configured to receive a reset signal, and a capacitor in electrical communication with the reset switch and the charge-sensitive amplifier. The detector circuit further includes a shaping amplifier configured to shape the amplified signal into a shaped signal generally with time duration of 50 ns or less. The detector circuit further includes energy readout and circuitry configured to receive the shaped signal from the shaping amplifier. The energy readout and control circuitry includes at least an integrator configured to receive the shaped signal and to integrate the shaped signal over a time interval to generate an integrated signal, a comparator configured to receive the integrated signal and compare the integrated signal to a threshold voltage such that integrated signals greater than the threshold voltage are output by the threshold comparator, and a peak analog-to-digital converter configured to receive inputs signals from the threshold comparator and the shaping amplifier and to output a measured energy for a detection event based on the input signals. The detector circuit further includes a delay circuit configured to receive an output from the threshold comparator and to generate a delay signal to operate the reset switch of the charge-sensitive amplifier.

BRIEF DESCRIPTION OF THE DRAWINGS

These and other features, aspects, and advantages of the present invention will become better understood when the following detailed description is read with reference to the accompanying drawings in which like characters represent like parts throughout the drawings, wherein.

DETAILED DESCRIPTION

One or more specific embodiments will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Furthermore, any numerical examples in the following discussion are intended to be non-limiting, and thus additional numerical values, ranges, and percentages are within the scope of the disclosed embodiments.

While the following discussion is generally provided in the context of medical imaging, it should be appreciated that the present techniques are not limited to such medical contexts. Indeed, the provision of examples and explanations in such a medical context is only to facilitate explanation by providing instances of real-world implementations and applications. However, the present approaches may also be utilized in other contexts, such as the non-destructive inspection of manufactured parts or goods (i.e., quality control or quality review applications), and/or the non-invasive inspection of packages, boxes, luggage, and so forth (i.e., security or screening applications). In general, the present approaches may be desirable in any imaging or screening context in which energy-discrimination in a photon-counting context is desirable.

As discussed herein, energy-resolved photon-counting detectors can provide detected energy information that is not available with conventional energy-integrating detectors. As noted above, various technical challenges may still arise in the use of such energy-resolved photon-counting detectors. The approach discussed in detail herein helps to resolve certain of these issues related to spectral contamination by transient signals in designs employing coincidence logic.

Figure 1:
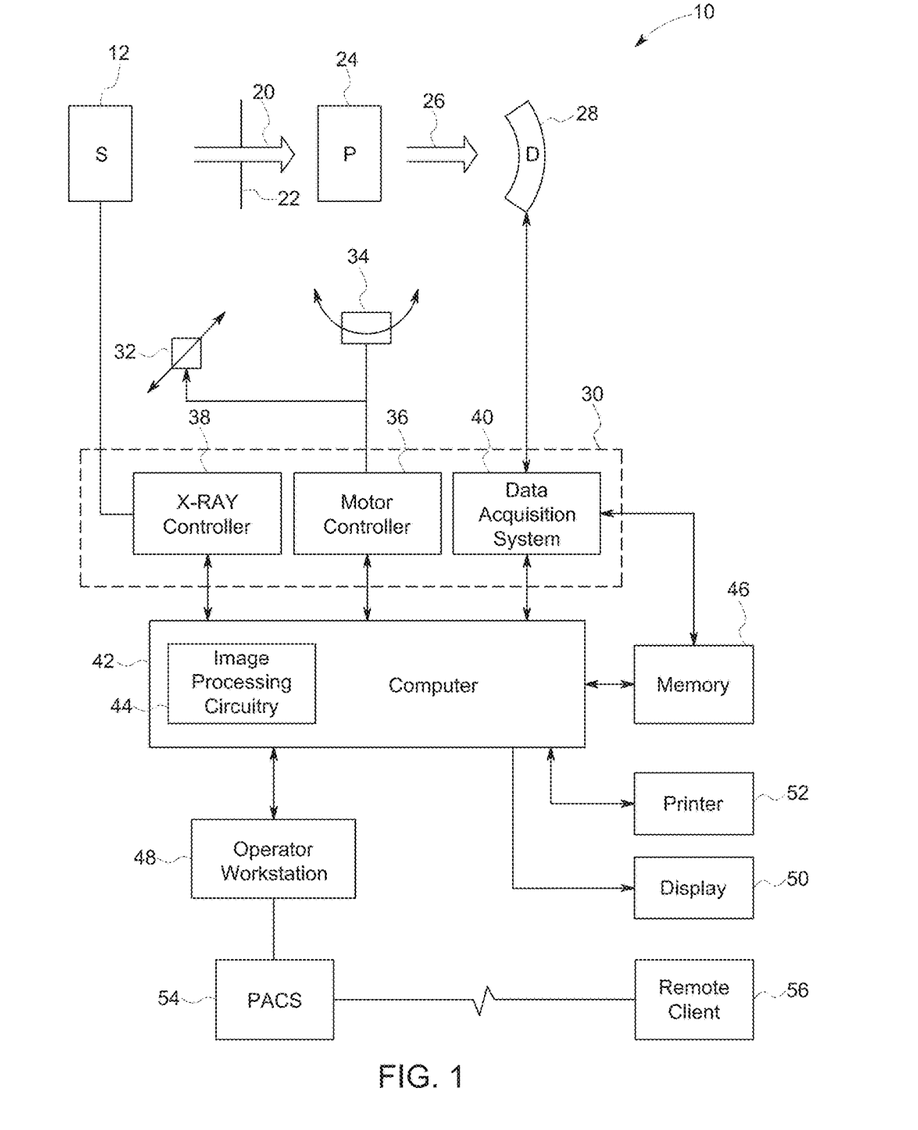
FIG. 1 is a schematic illustration of an embodiment of a computed tomography (CT) system configured to acquire CT images of a patient and process the images in accordance with aspects of the present disclosure.

Prior to discussing detailed aspects of the present approach however, an example of an imaging system on which such an approach may be employed is described so as to provide useful context. With this in mind, FIG. 1 illustrates an embodiment of an imaging system 10 for acquiring and processing imaging data in accordance with aspects of the energy-discriminating (i.e., energy-resolved photon-counting) approaches discussed herein. In the illustrated embodiment, system 10 is a computed tomography (CT) system designed to acquire X-ray projection data at multiple energy spectra (such as high- and low-energy spectra in a dual-energy context), to reconstruct the projection data into volumetric reconstructions, and to process the image data, including material decomposition or tissue-type image data, for display and analysis. The CT imaging system 10 includes one or more X-ray sources 12, such as one or more X-ray tubes or solid state emission structures which allow X-ray generation with one or more energy spectra having the required energy characteristics, during the course of an imaging session. For example, the emission spectra may differ in one or more of their mean, median, mode, maximum, or minimum X-ray energies.

By way of example, in one embodiment an X-ray source 12 (e.g., an X-ray tube) may be switched between a relatively low-energy polychromatic emission spectrum (e.g., X-ray tube operating voltage at about 80 kVp) and a relatively high-energy polychromatic emission spectrum (e.g., X-ray tube operating voltage at about 140 kVp). As will be appreciated, the X-ray source(s) 12 may emit at polychromatic spectra localized around energy levels (i.e., spectra induced by specific kVp ranges) other than those listed herein and/or at more than two emission spectra for a given examination. Selection of the respective energy levels for emission may be based, at least in part, on the anatomy being imaged and the chemical or molecules of interest for tissue characterization.

In certain implementations, the source 12 may be positioned proximate to a filter assembly or beam shaper 22 that may be used to steer the X-ray beam 20, to define the shape and/or extent of a high-intensity region of the X-ray beam 20, to control or define the energy profile of the X-ray beam 20, and/or to otherwise limit X-ray exposure on those portions of the patient 24 not within a region of interest. In practice, the filter assembly or beam shaper 22 may be incorporated within the gantry between the source 12 and the imaged volume within patient 24.

The X-ray beam 20 passes into a region in which the subject (e.g., a patient 24) or object of interest (e.g., manufactured component, baggage, package, and so forth) is positioned. The subject attenuates at least a portion of the X-rays 20, resulting in attenuated X-rays 26 that impact a detector array 28 formed by a plurality of detector elements (e.g., pixels) as discussed herein. The detector 28 may be an energy-resolved photon-counting detector, whose outputs convey information about the number and energy of photons that impact the detector at measured positions during acquisition intervals within a scan or imaging session. In certain such embodiments, the energy-resolved photon-counting detector may be a direct-conversion type detector (i.e., comprising cadmium-zinc-telluride, CZT, or cadmium-telluride, CdTe).

Each detector element produces an electrical signal that represents the energy deposition of incident X-ray photons at the position of the detector element. Electrical signals are acquired and processed to generate one or more projection datasets. In the depicted example, the detector 28 is coupled to the system controller 30, which commands acquisition of the digital signals generated by the detector 28.

A system controller 30 commands operation of the imaging system 10 to execute filtration, examination and/or calibration protocols, and to process the acquired data. With respect to the X-ray source 12, the system controller 30 furnishes power, focal spot location, control signals and so forth, for the X-ray examination sequences. In accordance with certain embodiments, the system controller 30 may control operation of the filter assembly 22, the CT gantry (or other structural support to which the X-ray source 12 and detector 28 are attached), and/or the translation and/or inclination of the patient support over the course of an examination.

In addition, the system controller 30, via a motor controller 36, may control operation of a linear positioning subsystem 32 and/or a rotational subsystem 34 used to move components of the imaging system 10 and/or the subject 24. The system controller 30 may include signal-processing circuitry and associated memory circuitry. In such embodiments, the memory circuitry may store programs, routines, and/or encoded algorithms executed by the system controller 30 to operate the imaging system 10, including the X-ray source 12 and/or filter assembly 22, and to process the digital measurements acquired by the detector 28 in accordance with the steps and processes discussed herein. In one embodiment, the system controller 30 may be implemented as all or part of a processor-based system.

The source 12 may be controlled by an X-ray controller 38 contained within the system controller 30. The X-ray controller 38 may be configured to provide power, timing signals, and/or focal spot size and locations to the source 12. In addition, in some embodiments the X-ray controller 38 may be configured to selectively activate the source 12 such that tubes or emitters at different locations within the system 10 may be operated in synchrony with one another or independent of one another or to switch the source between different energy spectra during an imaging session.

The system controller 30 may include a data acquisition system (DAS) 40. The DAS 40 receives data collected by readout electronics of the detector 28, such as digital signals from the detector 28. The DAS 40 may then convert and/or process the data for subsequent processing by a processor-based system, such as a computer 42. In certain implementations discussed herein, circuitry within the detector 28 may convert analog signals of the photodetector to digital signals prior to transmission to the data acquisition system 40. The computer 42 may include or communicate with one or more non-transitory memory devices 46 that can store data processed by the computer 42, data to be processed by the computer 42, or instructions to be executed by image processing circuitry 44 of the computer 42. For example, a processor of the computer 42 may execute one or more sets of instructions stored on the memory 46, which may be a memory of the computer 42, a memory of the processor, firmware, or a similar instantiation.

The computer 42 may also be adapted to control features enabled by the system controller 30 (i.e., scanning operations and data acquisition), such as in response to commands and scanning parameters provided by an operator via an operator workstation 48. The system 10 may also include a display 50 coupled to the operator workstation 48 that allows the operator to view relevant system data, imaging parameters, raw imaging data, reconstructed data (e.g., soft tissue images, bone images, segmented vascular trees, and so on), basis material images, and/or alternative material decomposition images, and so forth. Additionally, the system 10 may include a printer 52 coupled to the operator workstation 48 and configured to print any desired measurement results. The display 50 and the printer 52 may also be connected to the computer 42 directly (as shown in FIG. 1) or via the operator workstation 48. Further, the operator workstation 48 may include or be coupled to a picture archiving and communications system (PACS) 54. PACS 54 may be coupled to a remote system or client 56, radiology department information system (RIS), hospital information system (HIS) or to an internal or external network, so that others at different locations can gain access to the image data.

With the preceding discussion of an overall imaging system 10 in mind, as previously noted, certain challenges remain in the use of energy-discriminating, photon-counting detectors. As noted herein, one issue in the use of energy-resolved, photon-counting detectors are the limitations related to count-rate capability. In particular, in the presence of X-ray photon flux that is too high, the detected signal gets distorted due to the pile-up effect, where the electrical signal from temporally-adjacent events may be merged or overlap. To address these effects of signal or output pile-up, a circuit with a fast shaping time may be used to improve the count rate capability. Such a fast shaper can differentiate the individual photon detection events that occur within a short time interval. However, as noted, the fast shaper can also lead to incomplete charge collection as a consequence of differentiating signals from different detection events that might otherwise merge together when using a slower shaping time. This incomplete charge collection makes the output signal more sensitive to the cross-talk (i.e., transient) signal, which is an induced signal in neighboring pixels resulting from a photon detection within a given pixel.

Figure 2:
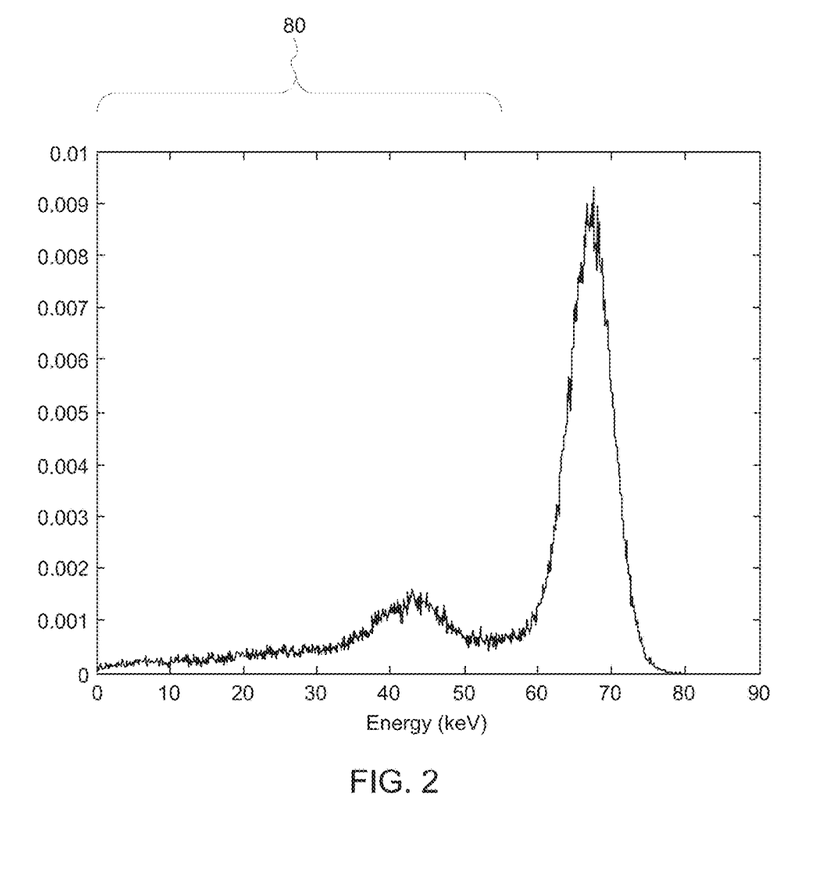
FIG. 2 depicts a plot of detector spectral response including charge-sharing events, in accordance with aspects of the present disclosure.

In addition, a second challenge to the use of CZT-/CdTe-based detectors is attributable to so-called charge-sharing events. In particular, when a photon detection event occurs near the edge of a detector pixel, detection events in multiple neighboring pixels occur by either multiple X-ray interactions (K-escape X-ray, Compton Scatter) or charge from a single, electron cloud being shared between adjacent pixels. These effects cause a low-energy energy tail 80 in the spectral response function, as shown in FIG. 2.

To address the multiple X-ray interaction and charge-sharing problems, one possibility is to employ coincidence logic circuitry, which identifies the multiple-pixel event trigger based on proximity in timing and position, i.e., detection events within a predetermined timing window between neighbor pixels. When coincident events are detected, the energy deposition is calculated by summing the signal of the neighboring pixels. (i.e., $E_{Tot}=E_1+E_2$ if two detector pixels were involved in the coincidence event).

Figure 3:
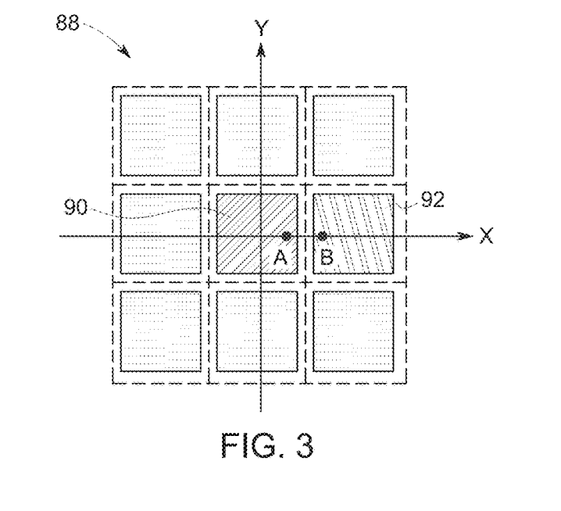
FIG. 3 depicts a view from above of an array of pixels in which adjacent pixels experience a trigger event, in accordance with aspects of the present disclosure.

However, the implementation of both a shaper with a fast shaping time and coincidence circuitry may lead to an additional challenge, the incidental summing (by the operation of the coincidence logic after shaping and peak-hold circuitry) of transient signals leading to an overestimation of the X-ray photon energy deposition in these instances. By way of example, FIG. 3 depicts an illustrative detector pixel arrangement (i.e., array 88) having a first pixel 90 and second pixel 92. In accordance with a present simulation, the CZT sensor was approximately 2.5 mm thick, had anode electrodes with 550-µm pitch (including a 50-µm gap between electrodes), operated at an electric field of 450 V/mm, and had an origin of x=0, y=0 at the center of the first pixel 90.

Figure 4:
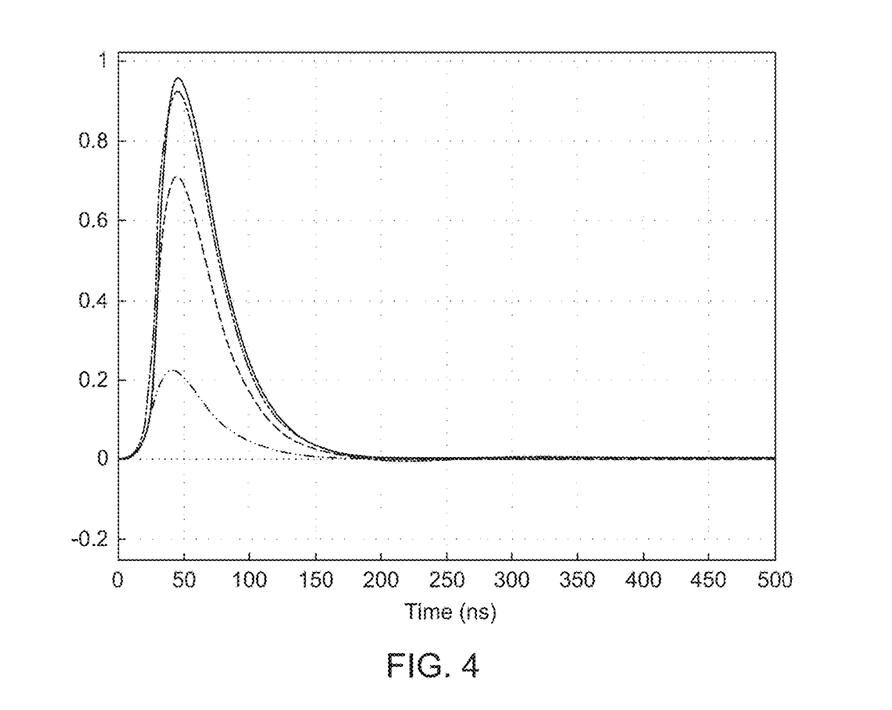
FIG. 4 depicts a plot of detector signals in an example where an actual charge-sharing event occurs, in accordance with aspects of the present disclosure.

In a first example, the results of which are graphically depicted in FIG. 4, an actual multiple-pixel event has occurred at the edge of the first pixel 90 at the position denoted "A" (at x=0.22 mm, y=0 mm from the origin at the center of the first pixel 90 and at z=1.25 mm, where z is the out-of-plane dimension with respect to the depicted pixel array representation) and the edge of the second pixel 92 at the position denoted "B" (at x=0.3 mm, y=0 mm, and z=1.25 mm). In this case 75% of the incident X-ray photon energy is deposited in the first position "A" and 25% of the energy is deposited in the second pixel at position "B". Since the multiple-pixel event always experience charge loss due to reciprocal transient signals between pixels, the summation of the signals from two adjacent pixel by coincidence logic can recover 93% of the induced charge signal (without extra transient signal correction), relative to a total of 96% induced charge signal collected by a single-pixel event. Note that 100% charge collection assumes complete collection of both electrons and holes. When using fast (i.e., 20-ns) shaping, the multiple-pixel signals are not fully recovered, giving rise to the additional 3% error.

Figure 5:
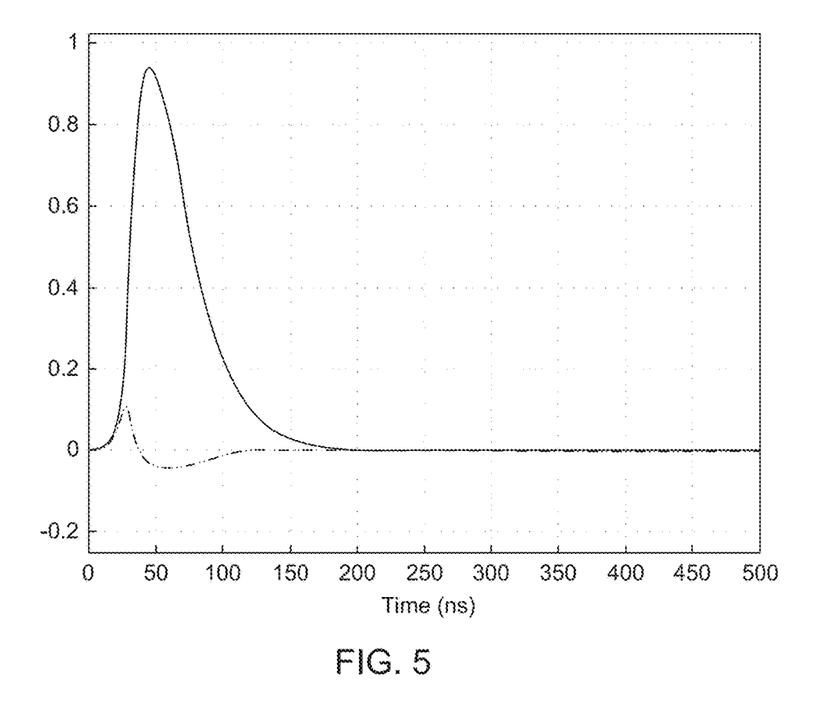
FIG. 5 depicts a plot of detector signals in an example where an actual charge-sharing event does not occur but a transient signal is detected, in accordance with aspects of the present disclosure.

Conversely, in the second example, the results of which are graphically depicted in FIG. 5, a single-pixel event has occurred, so that 100% of the photon's energy is deposited in the first pixel at position "A" and 0% is deposited in the second pixel at position "B". However, in this example, a transient signal, which is induced by the movement of electrons in the collecting ($1^{st}$) pixel is detected by the non-collecting ($2^{nd}$) pixel. This transient signal could be sufficient to surpass the noise discrimination threshold after fast shaping, which is necessitated by the incident high count rate and charge-sharing/multiple X-ray interaction event recovery, and mistaken by the coincidence logic as such an event. The coincidence circuitry then erroneously sums the peak transient and true-event signals, causing an overestimation of the signal by approximately 10% in this example.

The present approach provides a coincidence-capable photon-counting detector design that addresses the challenges noted above with respect to spectral contamination by transient signals due to the small pixel effect. In particular, as described herein, a circuit is provided which may be implemented as part of the detector readout circuitry or as circuitry in the detector acquisition system, and which allows for the use of fast shaping (i.e., 10 ns to 50 ns) for high count rate and coincidence-capability to address both charge-sharing multiple X-ray interaction events, while avoiding the issues noted above.

Figure 6A:
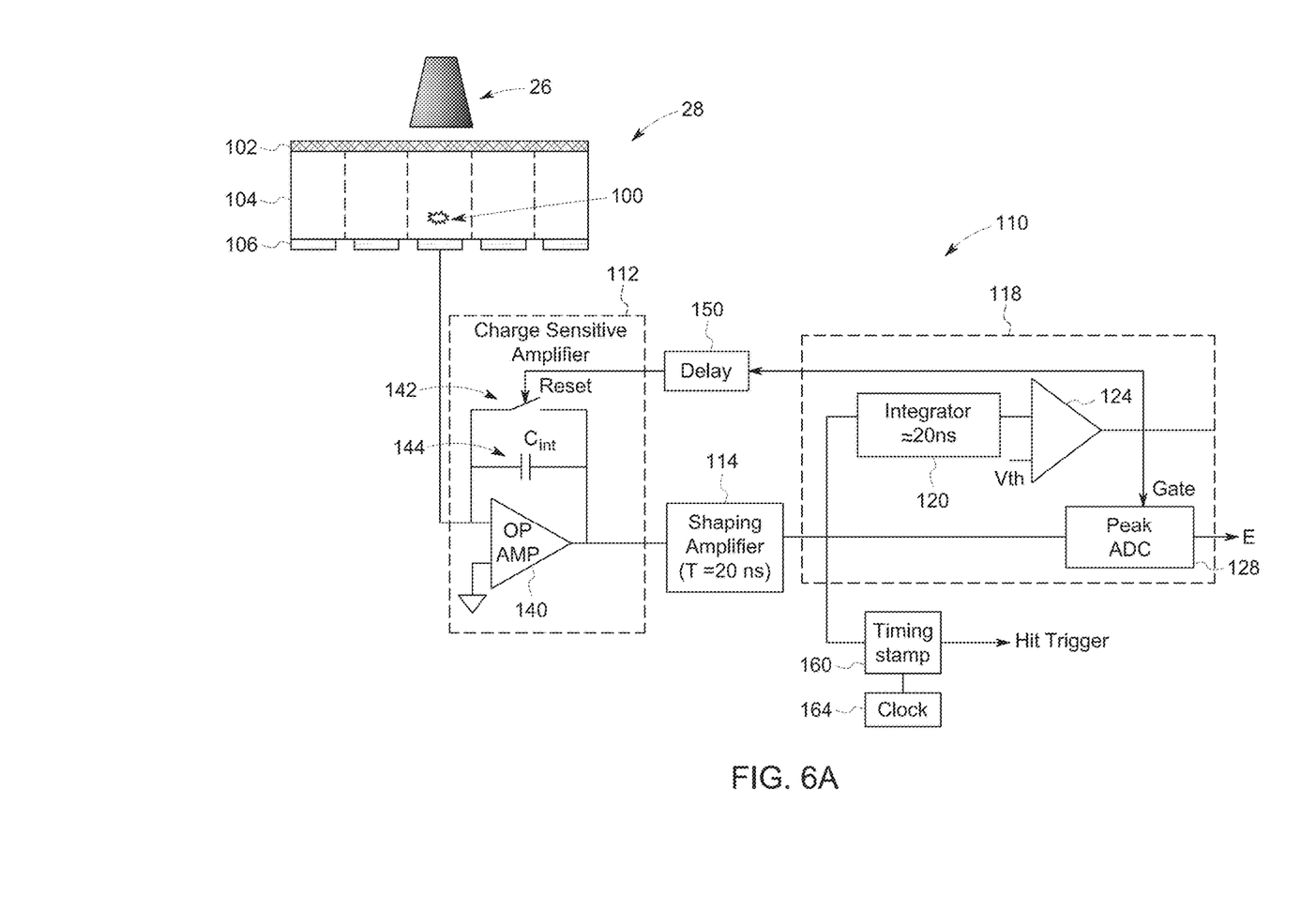
FIGS. 6a and 6b depicts a circuit diagram of a first implementation of a detector circuit, in accordance with aspects of the present disclosure.
Figure 6B:
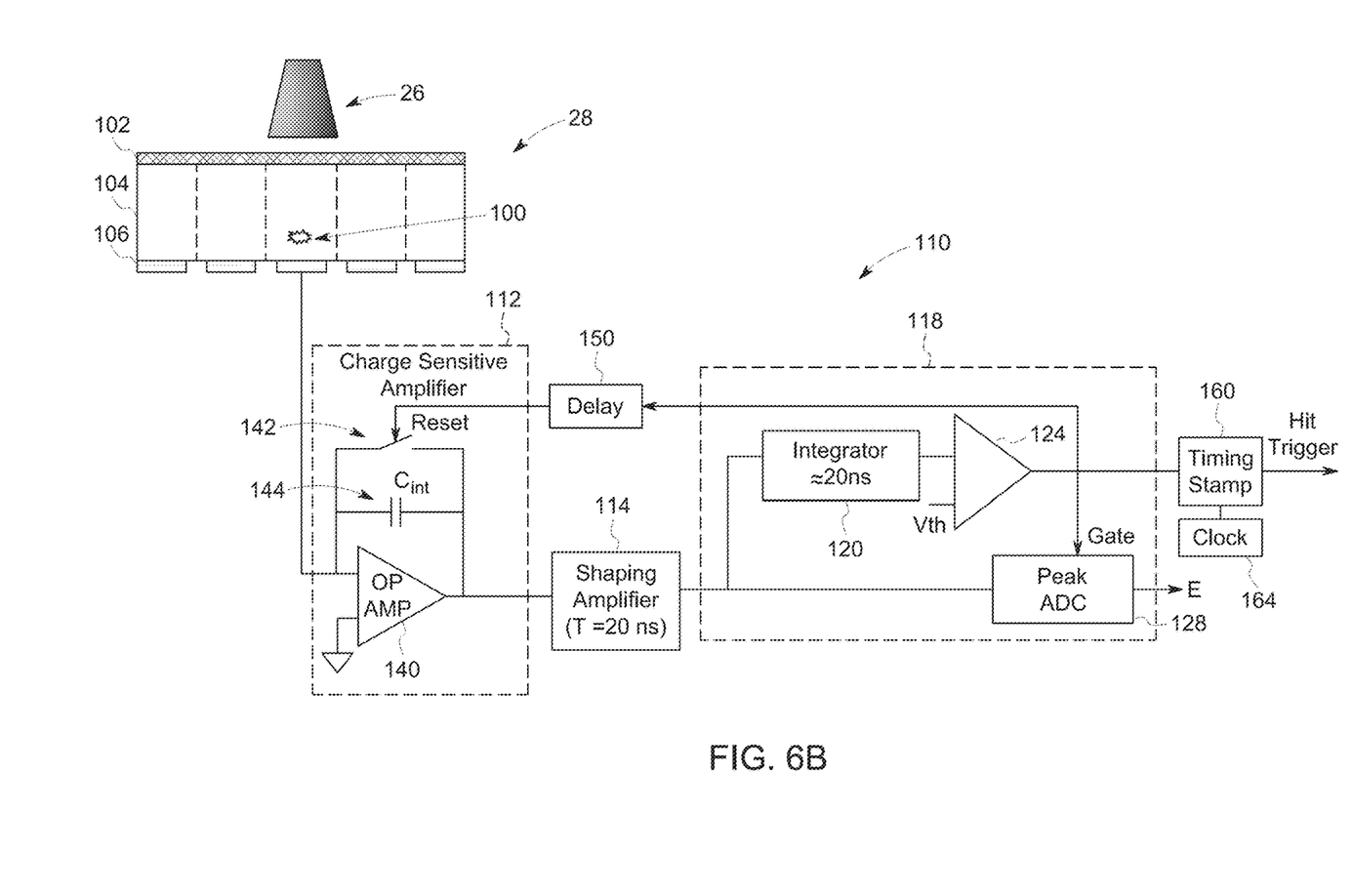

Turning to FIGS. 6a and 6b, a CZT-/CdTe-based detector 28 is shown on which an attenuated X-ray beam 26 may be incident. In this example, the direct-conversion material 104 (e.g., CZT or CdTe) is positioned between cathode 102 and anodes 106. In the depicted example, an X-ray photon detection event 100 is depicted as occurring within one of the pixels of the detector. A corresponding deposited charge is readout from the corresponding pixel by a detector circuit 110.

In the depicted example, the detector circuit 110 includes a charge-sensitive amplifier 112 and a shaping amplifier 114 with fast shaping time (e.g., ≈20 ns as depicted in the example). The charge-sensitive amplifier 112 in the depicted example includes an amplifier 140, a capacitor ($C_{int}$) 144, and a reset switch 142 that is activated by energy readout and control unit 118, discussed below, after a delay introduced by delay circuitry 150. The output of the detector pixel (anode) is amplified and shaped by the charge-sensitive amplifier 112 and shaping amplifier 114, respectively, for further processing (e.g., energy characterization and readout).

Figure 7:
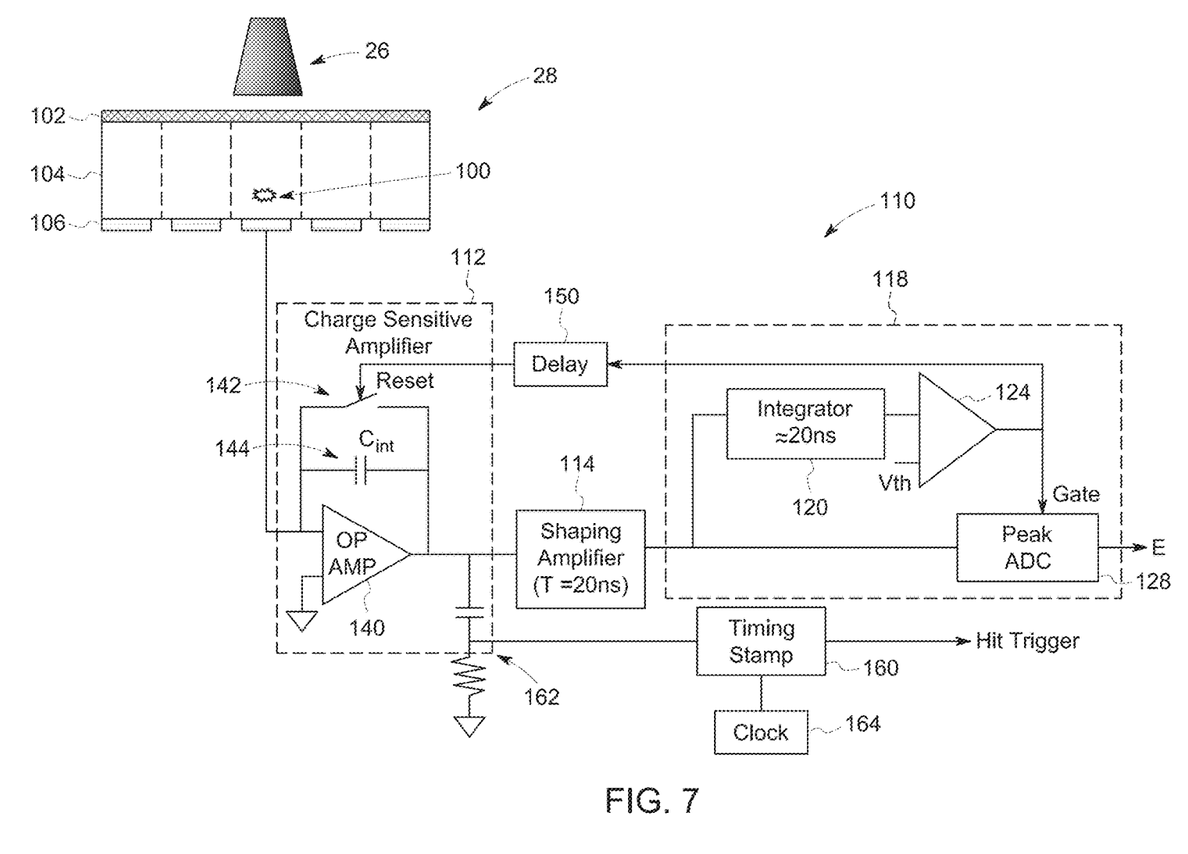
FIG. 7 depicts a circuit diagram of a second implementation of a detector circuit, in accordance with aspects of the present disclosure.

Energy readout and control circuitry 118 receives the output of the shaping amplifier 114 and discriminates the true signal from transient signal crosstalk. By way of example, within the depicted path, an integrator 120 acts to integrate the pulse over a window of time (10 ns to 40 ns; shown as ≈20 ns in FIGS. 6a, 6b, and 7), such that an integrated real signal is discernible from an integrated transient signal due to the significant difference in pulse shapes. The positive and negative portion of the transient signal gets cancelled out after the integrator 120 with the use of a short-time window. The comparator 124 includes an adjustable threshold. Only signals greater than the threshold are passed on, then digitalized by a peak analog-to-digital converter (ADC) circuit 128 which, based upon these inputs, outputs a measured energy, E, for the photon detection event 100 (i.e., a single event or photon count), thereby providing the energy discriminating aspect of the detector 28. In addition, the timing information required by the coincidence logic could be obtained from shaping signal (FIG. 6a) or comparator output (FIG. 7b). In the depicted example, the timing stamp circuit 160 also communicates with a clock circuit 164 so as to generate a hit trigger output, i.e., an X-ray photon event with an associated time.

Turning to FIG. 7, in a further example, timing information may be extracted separately from the energy channel. In particular, since the shaping amplifier 114 is constrained to sufficient shaping time to collect most of induced charge created by the electron motion in the detector and integrator 120 acts as a low-pass filter, in some instances, there may be a potential loss of timing information. With this understanding, a timing stamp may be extracted separately. For example, as depicted in FIG. 7, a timing stamp circuit 160 may be provided which receives the output of the charge-sensitive amplifier 112 through a capacitor-resistor (CR) shaper 162. The timing stamp circuit 160 also communicates with a clock circuit 164 so as to generate a hit trigger output.

With the preceding circuit examples in mind, a detector circuit is provided for use with an energy-resolved photon-counting detector that employs both fast shaping and coincidence logic techniques. In this manner, the detector and associated circuitry can achieve a high count rate and superior spectral performance by summing multiple detected signals (e.g. between adjacent pixels) to recover charge-sharing and multiple X-ray interaction events while eliminating or reducing contamination by transient signals.

This written description uses examples to disclose the invention, including the best mode, and also to enable any person skilled in the art to practice the invention, including making and using any devices or systems and performing any incorporated methods. The patentable scope of the invention is defined by the claims, and may include other examples that occur to those skilled in the art. Such other examples are intended to be within the scope of the claims if they have structural elements that do not differ from the literal language of the claims, or if they include equivalent structural elements with insubstantial differences from the literal languages of the claims.

The invention claimed is:

1. A detector readout circuit, comprising:
   a charge-sensitive amplifier, comprising:
      an amplifier configured to receive an input signal from a radiation detector and to output an amplified signal;
      a reset switch configured to receive a reset signal; and
      a capacitor in electrical connection with the reset switch and amplifier;
   a shaping amplifier configured to receive the amplified signal and perform a shaping operation on the amplified signal to generate a shaped signal, wherein the shaping operation has a shaping time on the order of 50 ns or less;
   energy readout and control circuitry configured to receive the shaped signal from the shaping amplifier, the circuitry comprising:
      an integrator configured to receive the shaped signal and to integrate the shaped signal over time to generate an integrated signal;
      a comparator configured to receive the integrated signal and determine a true detection event such that the integrated signal is greater than a preset threshold, and
      a peak analog-to-digital converter configured to receive inputs signals from the comparator and the shaping amplifier and to output energy information of a detected true event;
   a delay circuit configured to receive an output from the comparator and to generate a delay signal to operate the reset switch of the charge-sensitive amplifier.

2. The detector circuit of claim 1, wherein the shaping amplifier is a fast shaping amplifier and has a shaping time of approximately 20 ns or less.

3. The detector circuit of claim 1, wherein the integrator integrates the shaped signal over a time window of approximately 10 ns to 40 ns.

4. The detector circuit of claim 1, wherein the integrator integrates the shaped signal over a time window so as to differentiate the true event signal from a transient signal if present.

5. The detector circuit of claim 1, further comprising:
   a clock circuit; and
   a timing stamp circuit in communication with the clock circuit and configured to receive the timing output and generate a hit trigger in response.

6. The detector circuit of claim 5, wherein the hit trigger corresponds to a time-stamped for the detection event.

7. The detector circuit of claim 1, further comprising:
   a capacitor-resistor shaper configured to receive the amplified signal and to generate a timing output.

8. The timing stamp circuit of claim 5, wherein the input signal for the timing stamp circuitry is generated by at least one of an output signal of a capacitor-resistor shaper circuit operating on the amplified signal, the shaping amplifier, or the comparator.

9. A method for processing a detector signal from an energy-resolved photon-counting radiation detector, the method comprising:
receiving the detector signal at an amplifier and outputting an amplified signal;
performing a shaping operation on the amplified signal to generate a shaped signal, wherein the shaping operation has a shaping time of 50 ns or less;
receiving the shaped signal at an integrator configured to integrate the shaped signal over time to generate an integrated signal;
comparing the integrated signal to a threshold and outputting a signal indicating that the integrated signal is greater than the threshold;
performing a peak analog-to-digital conversion based on the output of the comparison of the integrated signal to a threshold, and on the shaped signal to generate energy information of the detected event.

10. The method of claim 9, further comprising:
based on the output of the comparison, generating a delay signal and resetting operation of the amplifier using the delay signal.

11. The method of claim 9, further comprising:
receiving the amplified signal at a capacitor-resistor (CR) shaper and generating a CR shaper output.

12. The method of claim 9, further comprising:
generating a timing signal based upon at least of one a capacitor-resistor shaper signal using the amplified signal as input, the shaped signal, or the output signal indicating that the integrated signal is greater than the threshold, and also a clock signal.

13. The method of claim 9, wherein the shaping operation has a shaping time of approximately 20 ns or less.

14. The method of claim 9, wherein the integrator integrates the shaped signal over a time window of approximately 10 ns to 40 ns.

15. The method of claim 9, wherein the integrator integrates the shaped signal over a time window so as to discriminate a transient signal if present.

16. An imaging system, comprising:
an X-ray source configured to emit X-rays;
an energy-resolved photon-counting detector, comprising an array of detector pixels wherein each detector pixel is connected to a detector circuit, comprising:
a charge-sensitive amplifier, comprising:
an amplifier configured to receive as an input readout signals from the photon-counting, energy discriminating radiation detector and to output an amplified signal;
a reset switch configured to receive a reset signal; and
a capacitor in electrical communication with the reset switch and amplifier;
a shaping amplifier configured to receive the amplified signal and perform a shaping operation on the amplified signal to generate a shaped signal;
energy readout and control circuitry configured to receive the shaped signal from the shaping amplifier, the circuitry comprising:
an integrator configured to receive the shaped signal and to integrate the shaped signal over a time interval to generate an integrated signal;
a comparator configured to receive the integrated signal and determine a true detection event based on the comparison between the integrated signal and a threshold, and
a peak analog-to-digital converter configured to receive the amplified signal from the shaping amplifier and to output energy information for the true detected event based on the control signal from the comparator;
a delay circuit configured to receive an output from the comparator and to generate a delay signal to operate the reset switch of the charge-sensitive amplifier; and
image processing circuitry configured to receive at least the energy measurements of the peak analog-to-digital converter and to generate an image based on the energy measurements.

17. The imaging system of claim 16, wherein the energy-resolved photon-counting detector is manufactured with a semiconductor material, such as cadmium zinc telluride or cadmium telluride.

18. The imaging system of claim 16, wherein the shaping amplifier has a shaping time of approximately 20 ns or less.

19. The imaging system of claim 16, wherein the integrator integrates the shaped signal over a time window of approximately 10 ns to 40 ns.

20. The imaging system of claim 16, wherein the detector circuit further comprises:
a capacitor-resistor (CR) shaper configured to receive the amplified signal and to generate a timing output.

21. The imaging system of claim 16, wherein the detector circuit further comprises:
a clock circuit; and
a timing stamp circuit in communication with the clock circuit and configured to receive the timing output and generate a hit trigger in response.

* * * * *

UNITED STATES PATENT AND TRADEMARK OFFICE
CERTIFICATE OF CORRECTION

| | | |
|---|---|---|
| PATENT NO. | : 10,162,066 B2 | Page 1 of 1 |
| APPLICATION NO. | : 15/425800 | |
| DATED | : December 25, 2018 | |
| INVENTOR(S) | : Geng Fu et al. | |

It is certified that error appears in the above-identified patent and that said Letters Patent is hereby corrected as shown below:

In the Specification

Column 1,
Lines 9-10, delete "Biomedical Imaging and Bioengineering" and replace with -- Health --

Signed and Sealed this
Fourteenth Day of October, 2025

John A. Squires
*Director of the United States Patent and Trademark Office*